US012469386B2

(12) United States Patent
Cord et al.

(10) Patent No.: US 12,469,386 B2
(45) Date of Patent: Nov. 11, 2025

(54) DEVICE FOR VEHICLE IDENTIFICATION IN AN AUTOMATED LOGISTICS CENTER AND ASSOCIATED METHOD

(71) Applicant: Stanley Robotics, Versailles (FR)

(72) Inventors: Aurélien Cord, Paris (FR); Mathieu Lips, Paris (FR)

(73) Assignee: STANLEY ROBOTICS, Versailles (FR)

( * ) Notice: Subject to any disclaimer, the term of this patent is extended or adjusted under 35 U.S.C. 154(b) by 143 days.

(21) Appl. No.: 18/249,332

(22) PCT Filed: Oct. 14, 2021

(86) PCT No.: PCT/FR2021/051786
§ 371 (c)(1),
(2) Date: Apr. 17, 2023

(87) PCT Pub. No.: WO2022/079391
PCT Pub. Date: Apr. 21, 2022

(65) Prior Publication Data
US 2023/0394963 A1    Dec. 7, 2023

(30) Foreign Application Priority Data
Oct. 16, 2020 (FR) ..................................... 2010617

(51) Int. Cl.
G08G 1/017      (2006.01)
E04H 6/42       (2006.01)
(Continued)

(52) U.S. Cl.
CPC ........... *G08G 1/0175* (2013.01); *E04H 6/424* (2013.01); *G08G 1/04* (2013.01); *G06K 7/10297* (2013.01); *G06K 7/1413* (2013.01); *G06K 7/1417* (2013.01)

(58) Field of Classification Search
None
See application file for complete search history.

(56) References Cited

U.S. PATENT DOCUMENTS 5,764,163 A  *  6/1998  Waldman .............. G08G 1/04
                                                340/936
2002/0140924 A1* 10/2002 Wangler ............... G01S 7/4802
                                                356/28

(Continued)

OTHER PUBLICATIONS

International Search Report for International Application No. PCT/FR2021/051786 dated Jan. 28, 2022, 2 pages.

(Continued)

Primary Examiner — Tamara L Weber
(74) Attorney, Agent, or Firm — TraskBritt

(57) ABSTRACT

A system for managing a motor vehicle parking area comprises a plurality of physical media bearing a unique identifier selected from among the group consisting of a barcode optical identifier, a QR code, or an RFID tag. Each physical medium is arranged on or in a motor vehicle. The system further comprises at least one camera for filming the vehicles, an analysis means running a program for analyzing the images sent by the camera to extract the unique identifiers, and a means for wireless communication between the analysis means and at least one human or robotic conveyor moving or transporting the vehicles associated with the unique identifiers, so as to send to the at least one conveyor a digital message indicating the destination address of the vehicle. A method may be employed using the system to manage the motor vehicle parking area.

7 Claims, 2 Drawing Sheets

(51) Int. Cl.
*G08G 1/04* (2006.01)
*G06K 7/10* (2006.01)
*G06K 7/14* (2006.01)

(56)    References Cited

U.S. PATENT DOCUMENTS

| | | | |
|---|---|---|---|
| 2006/0180647 A1* | 8/2006 | Hansen | G07F 17/20 |
| | | | 235/375 |
| 2007/0031218 A1 | 2/2007 | Haag | |
| 2013/0246132 A1* | 9/2013 | Buie | G07F 9/001 |
| | | | 705/13 |
| 2014/0271062 A1 | 9/2014 | Dezer | |
| 2019/0355185 A1* | 11/2019 | Plafchan | G07B 15/00 |

OTHER PUBLICATIONS

International Written Opinion for International Application No. PCT/FR2021/051786 dated Jan. 28, 2022, 8 pages.

* cited by examiner

DEVICE FOR VEHICLE IDENTIFICATION IN AN AUTOMATED LOGISTICS CENTER AND ASSOCIATED METHOD

CROSS-REFERENCE TO RELATED APPLICATIONS

This application is a national phase entry under 35 U.S.C. § 371 of International Patent Application PCT/FR2021/051786, filed Oct. 14, 2021, designating the United States of America and published as International Patent Publication WO 2022/079391 A1 on Apr. 21, 2022, which claims the benefit under Article 8 of the Patent Cooperation Treaty to French Patent Application Serial No. FR2010617, filed Oct. 16, 2020.

TECHNICAL FIELD

The present disclosure relates to the field of devices and/or methods for managing motor vehicle storage zones or parking areas.

BACKGROUND

In the prior art, it is known to read, by a camera, the license plate of each vehicle entering and leaving a parking area.

U.S. Patent Application Publication No. US20140271062 describes an elevator system for passengers and vehicles transports a vehicle containing at least one passenger up to a desired parking space in a building with a plurality of floors. The elevator system for passengers and vehicles comprises a plurality of elevator cabs arranged substantially at a distance from a central well of the building. Each elevator cab comprises a housing and at least one door. The housing of the elevator cab has a floor, a ceiling and at least one side wall. The elevator cab is sized and configured to transport a vehicle and at least one passenger. The information relating to the parking space is read from the vehicle by an external sensor, such as an RFID sensor, a barcode reader, or the like.

U.S. Patent Application Publication No. 2007031218 describes a system and method for automated storage and recovery of vehicles, containers, and ships in a multi-floor parking garage. This system uses receiving means configured to receive identification data that are assigned uniquely to each vehicle associated with access to the vehicle transfer area.

U.S. Patent Application Publication Nos. US20140271062 and patent US2007031218 do not relate to the identification of a vehicle, but rather to the identification of a parking space by a vehicle already identified by its license plate.

It is thus desirable to propose a simple and inexpensive identification solution in the case of motor vehicle storage zones or new vehicle parking areas.

The technical problem to be solved is to ensure the identification of a new vehicle, not yet registered, with a view to its automatic movement to a location that is provided for that vehicle, without any interference with the vehicle, in a safe manner, which can be used remotely and does not require modification of the vehicle.

BRIEF SUMMARY

The management system according to the present disclosure a simple, inexpensive, reusable solution since the media and the associated identifiers can be re-assigned.

The present disclosure relates, in the most general sense, to a system for managing vehicle storage zones or to a motor vehicle parking area comprising a camera, having the technical features set out by claim 1 or the dependent claims.

"Reusable medium" within the meaning of the present patent will be understood to mean an easily movable medium to be placed in a vehicle or removed from the vehicle, without any tools or irreversible connection.

"Camera" within the meaning of the present patent means an image acquisition means, in particular, an image sensor, or an infrared scanning device. The communication means may comprise a communication link (wired or wireless) between the gate and a centralized system that is itself connected to the conveyors, humans or robotic, that it manages.

The gate may comprise a plurality of devices for detecting/reading a bar code or QR code/Reading an RFID tag so as to properly surround the vehicle.

Preferably, each physical medium is a sheet of paper. Each sheet of paper is placed on the dashboard of the vehicle and near the windshield or glued onto a side window. For example, the paper sheet format is A4 (21 centimeters by 29.7 centimeters).

Advantageously, the unique optical identifier is printed over at least 50% of the surface of the physical medium. This feature makes it possible to make the identifier more visible and/or distinctive for the camera.

According to a variant embodiment, the identifier is an RFID tag applied to a window of the vehicle.

According to a variant embodiment, the system comprises a lighting means designed to illuminate a vehicle.

Preferably, the system comprises a frame bearing at least one camera. The frame may also the lighting means.

For example, the frame is a gate allowing the passing of a vehicle. The term "gate" means two vertical posts connected together by a horizontal crossbar. The vertical posts have a length greater than or equal to the height of a motor vehicle. The camera and possibly the lighting means may be carried by the horizontal spar of the gate or one or both of the 2 vertical uprights.

According to a variant embodiment, the frame is a vertical bar. The camera and the lighting means may be carried at the top of the vertical bar.

According to a second aspect, the present disclosure relates to a method for managing a motor vehicle storage zone or a motor vehicle parking area, during which at least one vehicle conveyor is provided for moving or transporting a vehicle, characterized by the following steps:

arranging a physical medium carrying a unique, barcode-type identifier or a QR code or an RFID tag near a glazed surface in each of the vehicles, moving or transporting a vehicle using a vehicle conveyor, having the moved or transported vehicle go in front of a camera so that it films the unique optical identifier associated with the vehicle, or in front of an RFID tag so that it recognizes the unique RFID identifier associated with the vehicle, analyzing the unique optical identifier or RFID by an analysis means, sending, via wireless communication means, a digital message indicating the destination address to the conveyor.

BRIEF DESCRIPTION OF THE DRAWINGS

The present disclosure will be better understood from reading the following description, referring to a non-limiting exemplary embodiment illustrated by the appended drawings, wherein.

DETAILED DESCRIPTION

Figure 1:
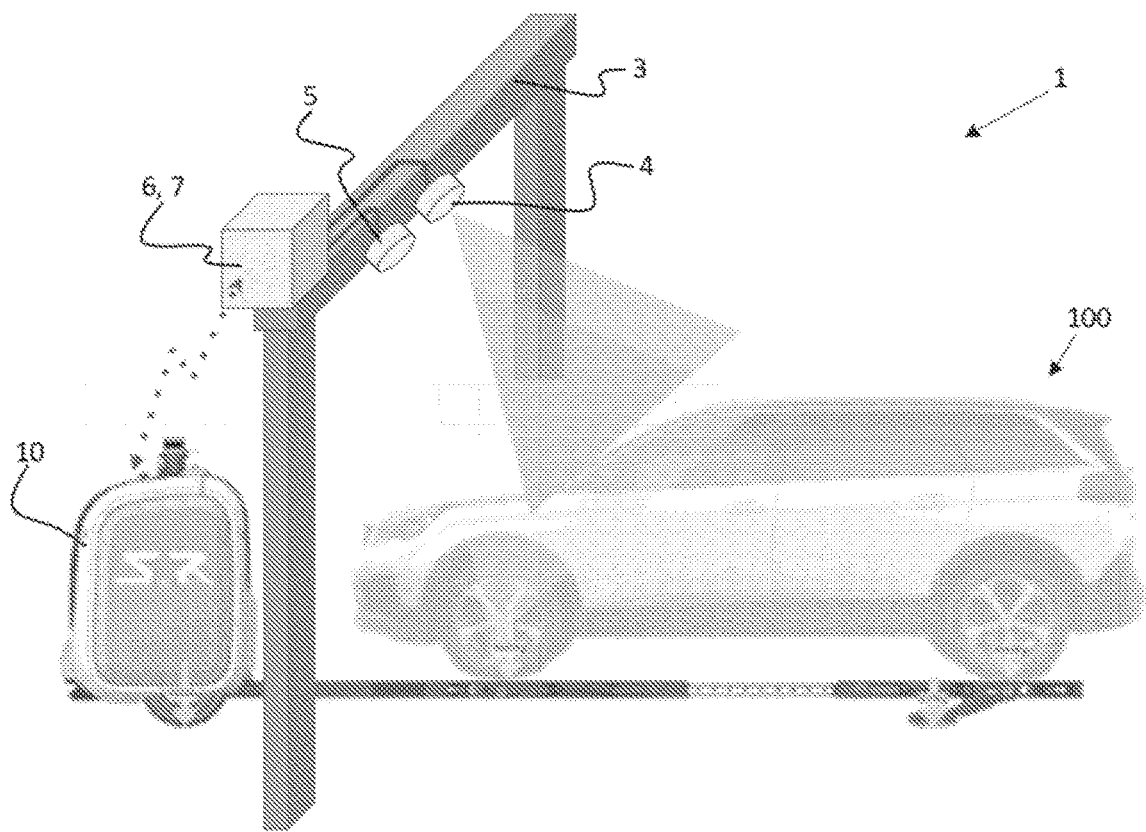
FIG. 1 shows a system for managing a parking area according to a first embodiment, the system comprising a gate carrying a camera, a lighting means, an analysis means and a means for wireless communication, the camera filming a unique optical identifier placed inside a motor vehicle transported by a vehicle conveyor.

FIG. 1 shows a system or a device 1 for managing motor vehicle storage zones or a motor vehicle parking area.

The system comprises an electrical vehicle conveyor 10 arranged to move or transport a motor vehicle 100. Each conveyor is arranged and/or programmed to cover a parking area having motor vehicles awaiting delivery, in this case new vehicles not comprising license plates, and transporting a vehicle from the storage zone of the parking area to the transfer zone of the parking area.

Furthermore, each motor vehicle comprises a medium, for example, a sheet of paper on which a unique identifier is printed, the medium being placed on the dashboard or adhesively bonded to a window so as to be visible through the windshield from outside the vehicle (not shown). The unique identifier is a barcode or a QR code.

The system comprises a gate 3 carrying a camera 4 and a lighting means 5. The camera 4 and the lighting means 5 are directed toward the windscreen of the vehicle, when it is presented, via a conveyor 10, in front of the gate. The camera 4 is arranged to read or scan the unique identifier.

The system comprises an analysis means 6. The analysis means 6 is connected to the camera 4 and arranged to run a program for analyzing the image sent by the camera 4 to extract the unique optical identifier. When a conveyor passes under the gate with a vehicle, the code read by the camera is communicated to the analysis means in order to associate it with the vehicle.

The management system further comprises a database in which each unique identifier is associated with a destination address. A wireless communication means 7 between the analysis means 6 and each conveyor makes it possible to send to the conveyor a digital message indicating the destination address of the vehicle transported by the conveyor.

The usefulness of such a system is particularly important when handling vehicles that do not yet have license plates, as is the case typically on the logistics sites for new vehicles.

Figure 2:
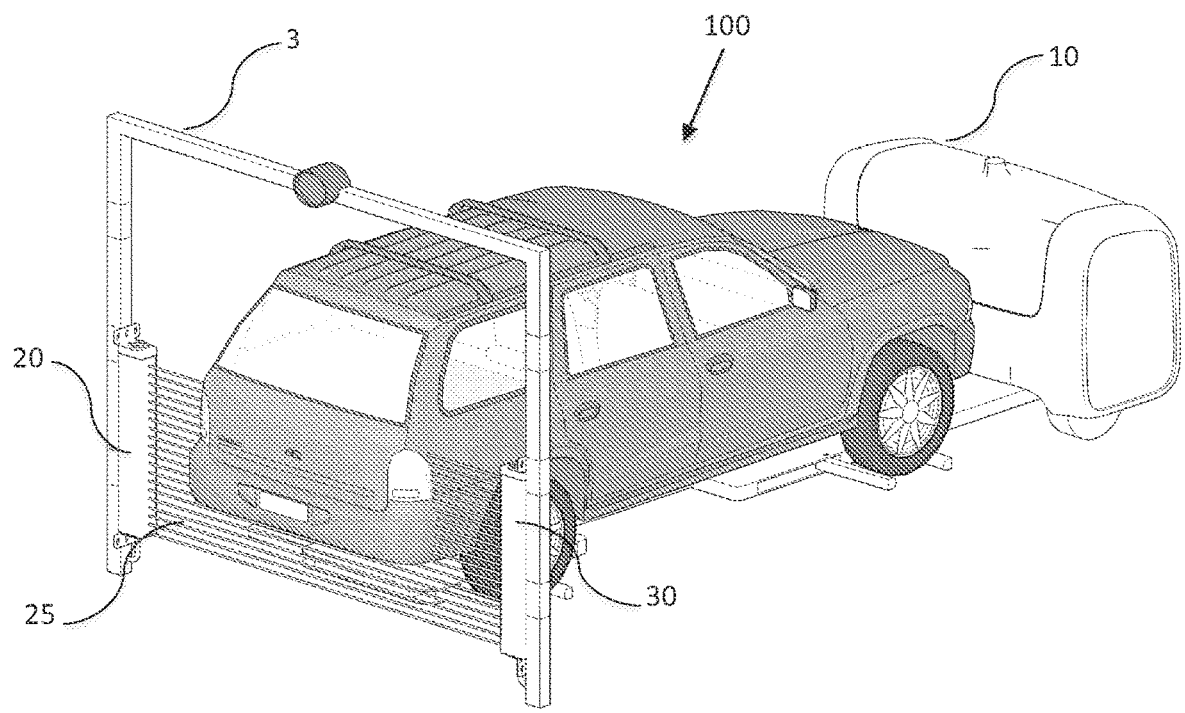
FIG. 2 shows a system for managing a parking area according to a second embodiment, the system further comprising a single optical curtain.
Figure 3:
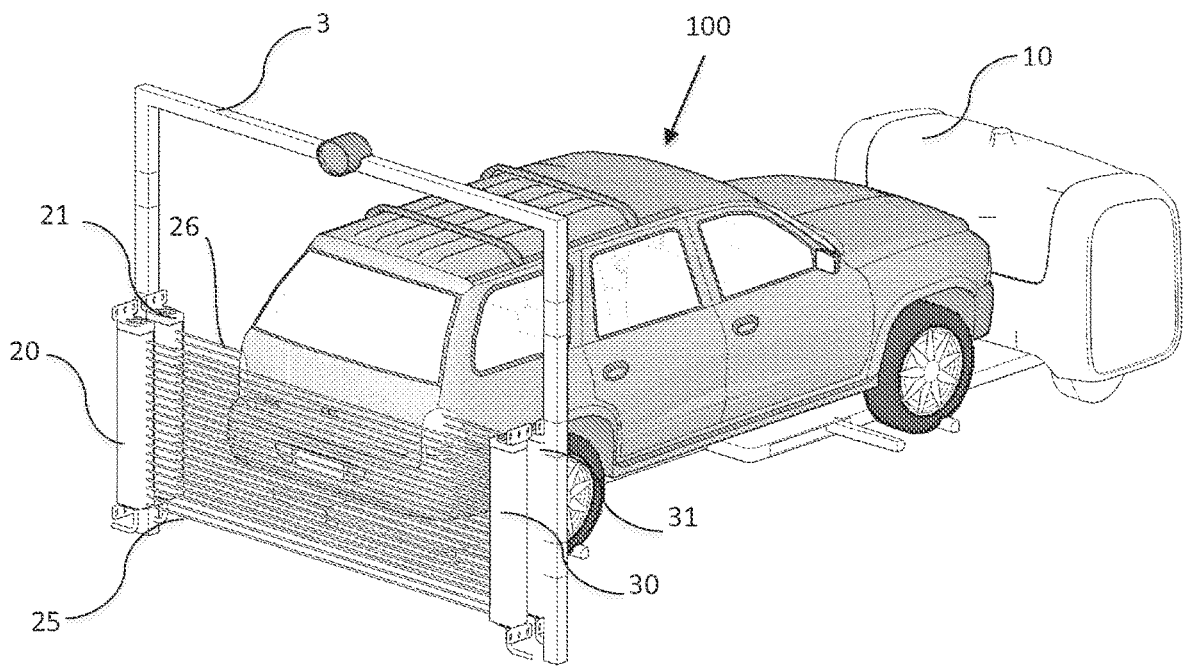
FIG. 3 shows a system for managing a parking area according to a third embodiment, the system further comprising a double optical curtain.
Figure 4:
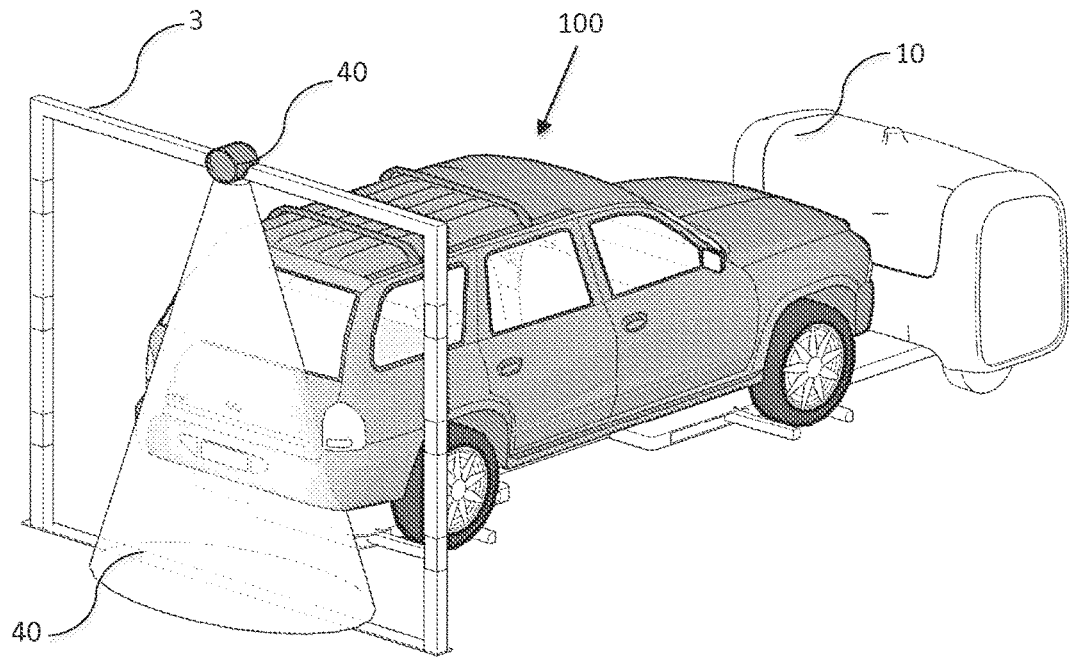
FIG. 4 shows a system for managing a parking area according to a fourth embodiment, the system further comprising a vertical detection camera.

FIGS. 2 to 4 illustrate a variant embodiment wherein the system incorporates a functionality for measuring the length of the vehicle.

According to these three variants, the gate (3) comprises an optical means interacting with a front end of the vehicle in order to allow for the passage of the vehicle (100) through the gate, to ascertain its length automatically.

According to the variant illustrated in FIG. 2, the gate (3) comprises a vertical post (20) comprising optical sources oriented transversely, in the direction of a second post (30) comprising photodetectors to form a light barrier (25) that is obscured when a vehicle goes past.

According to the variant illustrated in FIG. 3, the gate (3) includes two ramps (20, 21) of light sources and two ramps (30, 31) of photodetectors to form a double barrier (25, 26). This variant makes it possible to automatically detect the direction of movement.

According to the variant illustrated in FIG. 4, the gate (3) includes a camera (40) arranged vertically in the example described to detect the passing of the rear end of the vehicle (100).

The detection of the passing from the rear end then from the front end of the vehicle (or vice-versa) (100) moved by the conveyor (10) makes it possible to deduce the length of the vehicle (100) based on the disruptions caused to the light barrier(s) or on the beam of the camera (40).

When a robot (10) takes a vehicle (100) in a handover zone it must pass under a gate (required to pass between the handover zone and the storage zone).

When moving slowly under the gate, the location of the unseen face of the vehicle (100) passing under the gate (3) is acquired by virtue of the optical barrier or the camera (40), and the vehicle length is deduced in conjunction with the location of the robot (10) at the moment when the unseen face crosses the vertical section of the gate (3).

The invention claimed is:

1. A system for managing a motor vehicle parking area comprising a vehicle identification means, wherein the identification means comprises:
   a plurality of reusable physical media carrying a unique identifier selected from among the group consisting of a barcode optical identifier, a QR code, or an RFID tag associated with a memory containing a unique digital identifier, each physical medium being arranged on or in a motor vehicle;
   at least one sensor arranged to acquire information inscribed in the physical media of the vehicles;
   an analysis means connected to the at least one sensor, the analysis means running a program for analyzing the information sent by the sensor to extract the unique identifier; and
   a means for wireless communication between the analysis means and at least one human or robot conveyor moving or transporting the vehicle associated with the unique identifier, so as to send to the at least one human or robot conveyor a digital message indicating a destination address of the vehicle; and
   a frame carrying the at least one sensor, wherein the frame is a gate allowing a vehicle to pass, the gate comprising a means for detecting the passing of a front end of the vehicle moved by the conveyor, wherein the means for detecting the passing of a front end of the vehicle comprises a light barrier formed by a ramp of light sources oriented toward a ramp of a photodetector, wherein the ramp of light sources are arranged on a side of the gate and the ramp of the photodetector is arranged on an opposite side of the gate.

2. The management system of claim 1, wherein each reusable physical medium is a paper sheet bearing an inscription coding a unique identifier, and the sensor comprises a camera.

3. The management system of claim 1, wherein each physical medium comprises an RFID tag associated with a digital memory including a record of a unique digital identifier, and the sensor comprises an RFID reader.

4. The management system of claim 1, further comprising a lighting means configured to illuminate a vehicle.

5. The management system of claim 1, wherein the frame is a vertical bar.

6. The management system of claim 1, further comprising at least one vehicle conveyor equipped with a communication means for receiving movement instructions based on the unique identifier acquired by the at least one sensor and processed by the analysis means.

7. The management system of claim 1, wherein the means for detecting the passing of a front end of the vehicle comprises a double light barrier formed by two ramps of light sources oriented toward two ramps of photodetectors, wherein the two ramps of light sources are arranged on a side of the gate, and the two ramps of photodetectors arranged on an opposite side of the gate.

* * * * *